United States Patent [19]
Henderson et al.

[11] Patent Number: 5,653,389
[45] Date of Patent: Aug. 5, 1997

[54] INDEPENDENT FLOW RATE AND DROPLET SIZE CONTROL SYSTEM AND METHOD FOR SPRAYER

[76] Inventors: Graeme W. Henderson, 1777 La Cresta Dr., Pasadena, Calif. 91103; Durham K. Giles, 43 Parkside Dr., Davis, Calif. 95616; Kent D. Funk, #1 Quivira Ct., Hiawatha, Kans. 66434; Troy C. Kolb, R.R. 1, Box 131, Fairview, Kans. 66425

[21] Appl. No.: 528,941

[22] Filed: Sep. 15, 1995

[51] Int. Cl.$^6$ .................................................. B05B 12/00
[52] U.S. Cl. .................................................. 239/69; 239/172
[58] Field of Search .................................... 239/69, 73, 74, 239/100, 101, 171, 172; 364/424.07, 424.01, 551.01, 555

[56] References Cited

U.S. PATENT DOCUMENTS

| | | | |
|---|---|---|---|
| 4,121,767 | 10/1978 | Jensen | 239/71 |
| 4,523,280 | 6/1985 | Bachman | 364/324.07 |
| 4,530,463 | 7/1985 | Hiniker et al. | 239/71 |
| 4,630,773 | 12/1986 | Ortlip | 239/1 |
| 4,967,957 | 11/1990 | Bachman | 239/62 |
| 4,991,341 | 2/1991 | Douglas | 47/1.7 |
| 5,077,653 | 12/1991 | Barlet | 239/69 X |
| 5,134,961 | 8/1992 | Giles et al. | 118/684 |
| 5,182,704 | 1/1993 | Bengtsson | 239/69 X |
| 5,260,875 | 11/1993 | Tofte et al. | 364/424.07 |
| 5,334,987 | 8/1994 | Teach | 342/357 |
| 5,348,226 | 9/1994 | Heiniger et al. | 239/1 |
| 5,407,134 | 4/1995 | Thompson et al. | 239/156 |
| 5,499,198 | 3/1996 | Gaidos et al. | 364/555 |

OTHER PUBLICATIONS

Micro-Trak Systems, Inc. MT-5000 Automatic Sprayer Control System Installation/Operator's Manual, no date.
Satloc, no date.
FSCBG Predictions Coupled to GPS/GIS Aircraft Tracking, no date.
Past, Current, and Future Collaboration between the USDA Forest Service Pesticide Application Technology Group Forest Pest Management, Davis, CA and the New Zealand Forest Research Institute Plant Protection Chemistry Group, Rotorua, New Zealand, no date.
Trimble, TrimFlight GPS Technical Overview, Application & Technical Notes, no date.

Primary Examiner—Lesley D. Morris

[57] ABSTRACT

A flow rate and droplet size control system for a spray system including a spray liquid source, a pump, a spray liquid line and a nozzle assembly. The control system includes a setpoint conversion subroutine for independently controlling the flow rate and volume median droplet size setpoints. The control system also includes performance envelopes for various nozzle tips. An independent flow rate and droplet size control method is provided for use with the control system. A position-responsive control system receives information pertaining to the boundaries of spray zones and spray conditions, such as application rates and volume median droplet diameters associated with the spray zones. The position-responsive control system monitors the position of a spray vehicle, which can comprise a ground vehicle or an aircraft. The position-based control system changes the spray system operating conditions in response to the sprayer vehicle position. A position-based method of controlling the spray system utilizes the position-based control system.

56 Claims, 8 Drawing Sheets

INDEPENDENT FLOW RATE AND DROPLET SIZE CONTROL SYSTEM AND METHOD FOR SPRAYER

BACKGROUND OF THE INVENTION

1. Field of the Invention

The present invention relates generally to spraying, and in particular to agricultural spraying with vehicle-mounted spraying equipment, and more particularly to agricultural spraying with independent control of spray droplet sizes and application rates, and with a position-responsive control system.

2. Description of the Related Art

Spraying is a well-known method of applying a wide variety of bulk materials, primarily in liquid and powdered form in a fluid propellant medium. Such spray materials can be dispensed in air currents, under liquid pressure, by gravity flow, or with any other suitable discharge means.

Spray application of bulk materials offers many potential advantages, including efficiency, uniformity of coverage and flexibility to adapt spraying equipment to various conditions unique to the objects being sprayed and their particular environments.

However, a disadvantage with many spray systems relates to the drift of spray particles and droplets away from their intended targets. Such drift is at best inefficient, as in the case of the overspray which represents wasted spray material, and in more serious situations can cause damage to nearby property, environment and people.

The field of agricultural spraying includes pesticide application for crop pest management and the application of fertilizer and growth regulators for nutrient management. The agricultural spraying industry is quite large, with pesticides alone currently accounting for approximately $3,000,000,000 in estimated annual expenditures. However, the use of pesticides in agricultural applications produces substantial benefits in crop yields with an estimated annual savings of approximately $12,000,000,000 in crops which would otherwise be lost to pests. The spray application of fertilizers and growth regulators likewise produces substantial benefits in crop yields and the like.

Notwithstanding the substantial advantages of agricultural spraying applications of pesticides and other spray materials, agricultural spraying is generally a relatively inefficient process. Factors which contribute to such inefficiencies include the susceptibility of sprayed materials to wind drift, overspray and inaccurate placement on the intended target crop plants. Irregularities in terrain and nonuniform plantings also contribute to the inconsistent and inefficient application of agricultural spray materials. Moreover, variations in ambient conditions such as wind, humidity levels and temperature tend to reduce the uniformity and efficiency with which spray materials are applied to their intended crop targets.

In addition to the inefficiencies associated with misdirected agricultural spray materials, overspray and spray drift can create significant problems if the materials are inadvertently applied to adjoining areas for which they were not intended. Such misapplication of agricultural spray materials can result in crop damage, injury to livestock, contamination of environmentally-sensitive areas and unnecessary human exposure to toxic materials.

The problems associated with the misapplication of agricultural spray materials are exacerbated by the use of larger spraying equipment covering wider swaths, high speed vehicles, air-blast spraying, and by aerial spraying. The inherent difficulties associated with large-scale spraying operations are balanced against the relative efficiencies which are achieved by covering larger areas more rapidly with wide-swath spraying equipment.

The Heiniger et al. U.S. Pat. No. 5,348,226 discloses a spray boom system with automatic boom end height control which uses an ultrasonic height control system for conforming the spray boom orientations to topography and slope of a zone being sprayed in order to increase uniformity of coverage. Uniform spray nozzle height can be a significant factor in achieving uniform spray material coverage.

Another important factor in spray material deposition control is the droplet size spectrum of the liquid being sprayed. Spray droplet size has been shown to significantly affect both the efficacy of pesticide treatments and the potential for off-target spray movement. Such off-target movement and deposition of spray is often called "spray drift". Insecticides, fungicides, growth regulators and post-emergence herbicides are generally more effective when applied using relatively small droplets, which tend to provide greater penetration of plant canopies and uniform coverage of foliar surfaces. Smaller spray droplets, with shorter mechanical relaxation times, have the advantage of more closely following air currents into dense plant canopies for achieving greater penetration and more uniform coverage. Conversely, such droplet mobility associated with smaller droplet sizes can exacerbate problems associated with spray drift away from application sites. Generally speaking, larger droplets tend to fall more directly due to their greater mass and are thus less susceptible to spray drift, evaporation, etc.

A common technique for controlling the-application rate of spray liquid involves adjusting the spray liquid pressure, for example, with the use of a throttling valve in a main distribution line of a spray liquid distribution system. However, altering the liquid pressure also generally alters the droplet size, thus effecting the deposition and its susceptibility to spray drift, evaporation, etc.

The Giles et al. U.S. Pat. No. 5,134,961 discloses an electrically actuated variable flow control system wherein solenoid valves are actuated by square wave pulses, which can be varied in frequency and duty cycle for controlling volumetric flow through spray nozzles. The volumetric flow rate can thus be varied without changing droplet size and spray pattern since the liquid supply pressure can be maintained constant. However, heretofore there has not been available a control system for a spray system which combines selective and independent control of the flow rate and the median droplet size setpoints with the advantages and features of the present invention.

In addition to the aforementioned advantages of independently and selectively controlling the application rate and median droplet size setpoints, substantial advantages can be achieved by controlling spray deposition with respect to field position of a spray vehicle, such as a ground vehicle or an aircraft. Such position-responsive control can be important because spray zones in and around a field to be sprayed can require different treatment by a spray system, ranging from little or no application of spray materials (i.e., outside the boundary of a given site) to a maximum application rate in heavily infested areas or regions of poor fertility. The boundaries for such differential application rate spray zones can be irregular, with such irregularities increasing the difficulty of manually altering spray system operating conditions by an on-board operator. Moreover, problems can arise due to operator reaction times when changed field conditions call for adjustments to the spray conditions. For example, if an operator is alerted that he or she has crossed a field boundary or property line and initiates a procedure for altering spray application, most spray control systems have an inherent delay which may cause overspray problems.

To address some of these problems, control systems and methodology have heretofore been developed which respond to spray vehicle positions. For example, the Ortlip U.S. Pat. No. 4,630,773 discloses a method and apparatus for spraying fertilizer wherein a computerized control system includes a field map with digital information concerning various soil types. The control system disclosed therein dispenses fertilizer in accordance with the optimum applications for the different soil conditions encountered in a target field. The spray liquid application rate is automatically adjusted for vehicle speed. Sensors are disclosed for determining malfunctions of the application hardware. However, the application control provided by the Ortlip apparatus occurs only along the direction of travel and not along the boom section. Moreover, the Ortlip apparatus does not provide for droplet size control, drift control or spray transport modeling for spray liquid deposition prediction.

Recent improvements in the accuracy and effectiveness of the global positioning system (GPS) for civilian applications have also created opportunities for greater automation of agricultural spraying by controlling agricultural spraying equipment with positioning systems responsive to specific field conditions. For example, the Teach U.S. Pat. No. 5,334,987 discloses an agricultural aircraft control system using the global positioning system. The Teach agricultural aircraft control system is adapted for automatically opening a dispenser valve for releasing chemicals in response to the aircraft flying within the boundaries of an agricultural field. Moreover, the Teach system provides for recording flight data. However, the Teach system does not provide for droplet size control, drift reduction, spray transport modeling and gradients of application rates to avoid drift in the combination of the present invention.

A similar system is available from Trimble Navigation, Sunnyvale, Calif. 94088-3642 under its trademark "TrimFlight GPS". Mother GPS-based agricultural spray control system is available from Satloc of Tempe, Ariz.

Models for predicting dispersion and deposition of aerially released material have been in development for approximately the past 25 years in joint projects between the U.S.D.A. Forest Service, in cooperation with the U.S. Army. Computerized codes which are currently available include AGDISP (Agricultural DISPersal) (Bilanin et al., 1989) and FSCBG (Forest Service Cramer-Barry-Graham) (Teske et al., 1992b). Such computerized models can be useful for predicting dispersion patterns of various liquids under a variety of ambient conditions, heights, etc.

The problems associated with overspray in agricultural spraying operations can be detected with instruments such as a detector for spray particles, which is available under the trademark "DRIFT SENTRY" from Custom Farm Services, Stanfield, Ariz. 85272. Such spray particle monitors can be placed at the perimeters of fields being sprayed and provide appropriate radio transmission warning signals, which can be received in an agricultural spray aircraft.

SUMMARY OF THE INVENTION

In the practice of the present invention, a flow rate and droplet size control system is provided for a spray system which includes a spray liquid source, a discharge pump, a fluid line and a discharge nozzle assembly with a solenoid-activated nozzle valve and a nozzle tip. The control system includes a central application controller which receives input from a variety of peripheral devices for processing to control the operation of the spray system. A setpoint conversion subroutine is provided in the central application controller for independently controlling spray liquid flow rates and droplet sizes. The setpoint conversion subroutine utilizes desired flow rate and volume median droplet size setpoints as inputs and provides outputs which consist of required duty cycle and spray material pressure setpoints, which are implemented by the control system. Multiple nozzle assemblies can be selectively and individually controlled by the control system, and each can be operated at a unique operating condition with corresponding unique flow rate and droplet size setpoints. A method of controlling a spray system is provided which includes the steps of providing a spray system with a flow rate and droplet size control system, defining a current or first operating condition corresponding to respective droplet size and flow rate setpoints, and adjusting the operation of the spray system to achieve a subsequent or second operating condition with corresponding droplet size and flow rate setpoints. The operating conditions which can be achieved with the spray system are defined within a particular spray performance envelope which corresponds to one of a plurality of different nozzle tips which can be used with the spray system. A position-responsive spray control system is provided which independently controls volumetric flow rate and droplet size in relation to vehicle positions with respect to predefined spray zones. The spray zones are associated with different spray system operating conditions. The control system can utilize input data such as nozzle tip configurations, spray vehicle characteristics and ambient conditions. The global positioning system (GPS) is utilized with the position-responsive control system for providing position information to the control system through a GPS receiver incorporated therein. A position-responsive method of controlling a spray system includes the steps of providing a spray control system, independently varying volumetric flow rate and droplet size setpoints therewith, and varying at least one of the flow rate and droplet size setpoints in response to a position of the sprayer.

OBJECTS AND ADVANTAGES OF THE INVENTION

The principle objects and advantages of the present invention include: providing a flow rate and droplet size control system for a sprayer; providing such a system which provides for selective and independent control of volumetric flow rate and median droplet size setpoints; providing such a control system which utilizes a setpoint conversion subroutine for maintaining one of the median droplet size and flow rate setpoints while changing the other; providing such a control system which controls a flow rate at least partly by altering the duty cycles of nozzle valves; providing such a control system which utilizes nozzle assemblies with solenoid-activated nozzle valves; providing such a control system which utilizes a programmable controller; providing such a control system which receives input data from an operator; providing such a control system which can be initialized by a user with various field, equipment and operating condition data; providing such a control system which utilizes independently and selectively operable and adjustable nozzle assemblies; providing such a control system which can be mounted on various vehicles including ground vehicles and aircraft; providing such a control system which is adapted to store performance envelopes for multiple nozzle tips; providing such a control system which includes routines and procedures for altering the operating conditions of nozzle assemblies within their performance envelopes; providing such a control system which is adapted for retrofitting on an existing sprayer; providing a spray control method which selectively and independently controls volumetric flow rate and median droplet size setpoints; providing such a spray control method which utilizes a setpoint conversion subroutine step; providing such a spray control method which includes the steps of selectively and independently controlling the output of multiple spray nozzle assemblies; and providing such a spray control method which includes the step of initialization with performance envelopes for multiple spray nozzle tips.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Certain terminology will include the words specifically mentioned, derivatives thereof and words of a similar import.

Referring to the drawings in more detail, the reference numeral 2 generally designates a flow rate and droplet size control system, and more particularly a system which is adapted for independently and selectively controlling liquid spray material flow rate and droplet size. The flow rate and droplet size control system 2 controls the operation of a spray system 3. Without limitation on the generality of useful applications of the control system 2, it is disclosed in an agricultural spraying application, which involves the use of an agricultural sprayer 4.

Figure 1:
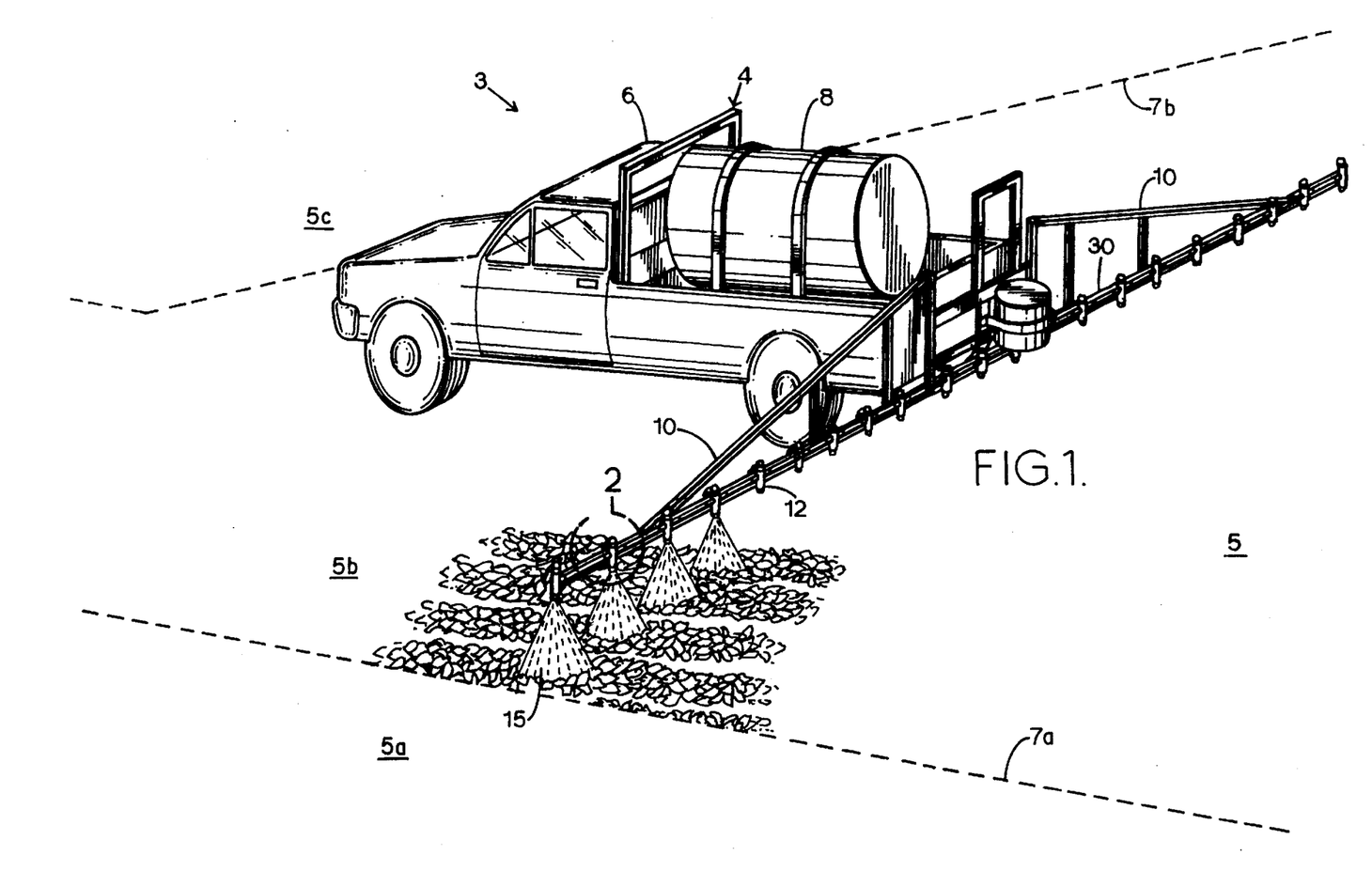
FIG. 1 is an upper, perspective view of an agricultural sprayer with a flow rate and droplet size control system embodying the present invention, shown in a field with multiple spray zones.

The spray system 3 is shown in operation in a field 5 which comprises a no-spray zone 5a outside of a first boundary 7a, a first spray zone 5b adjacent to the boundary 7a, and a second spray zone 5c within a second boundary 7b. The spray zones 5b, 5c have different spray deposition requirements, which can be accommodated by the spray control system 2. The field 5 is planted with crops 9.

II. Agricultural Sprayer 4

The agricultural sprayer 4 includes a vehicle 6 mounting a tank 8 and having multiple booms 10. Various agricultural sprayers are commercially available which incorporate one or more of these features and are thus suitable for use with the flow rate and droplet size control system 2, including both ground vehicles and aircraft, which can be provided with multiple, individually-controllable booms 10.

Figure 2:
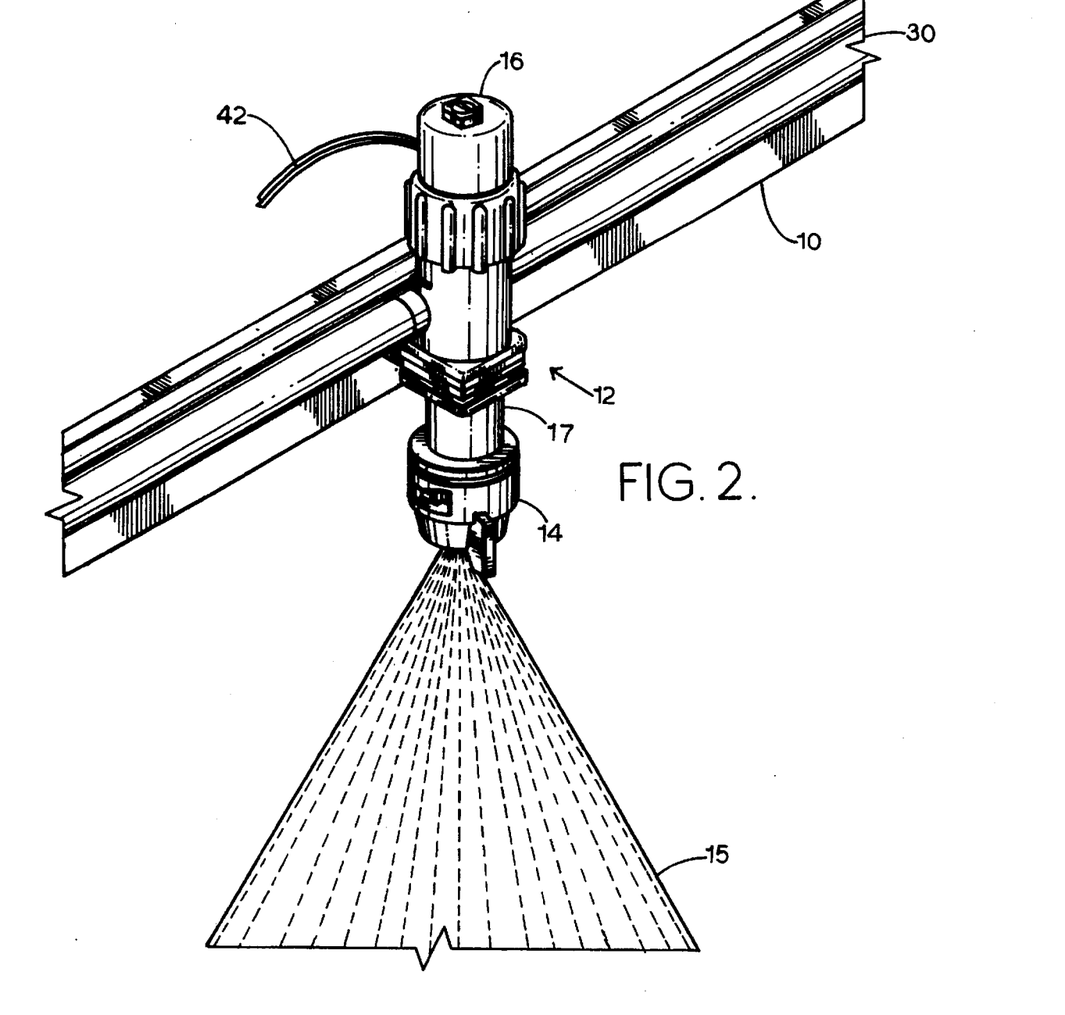
FIG. 2 is an upper perspective view of a nozzle assembly of the sprayer.

Each boom 10 mounts a plurality of spray nozzle assemblies 12 each of which can comprise, for example, an interchangeable nozzle tip 14 and a solenoid 16 connected to a nozzle valve 17 which has open and closed positions corresponding to the energization and deenergization respectively of the solenoid 16. A suitable quick-disconnect type nozzle tip 14 is available from Spraying Systems Co. of Wheaton, Ill., and is disclosed in U.S. Pat. No. 4,527,745. The solenoids 16 can be obtained from Kip, Inc. of Farmington, Conn. and can operate on an electrical system of the spray vehicle 6. A solenoid-activated spray nozzle is disclosed in the Giles et al. U.S. Pat. No. 5,134,961, which is incorporated herein by reference. Pneumatically or hydraulically actuated valves could also be used.

Figure 3:
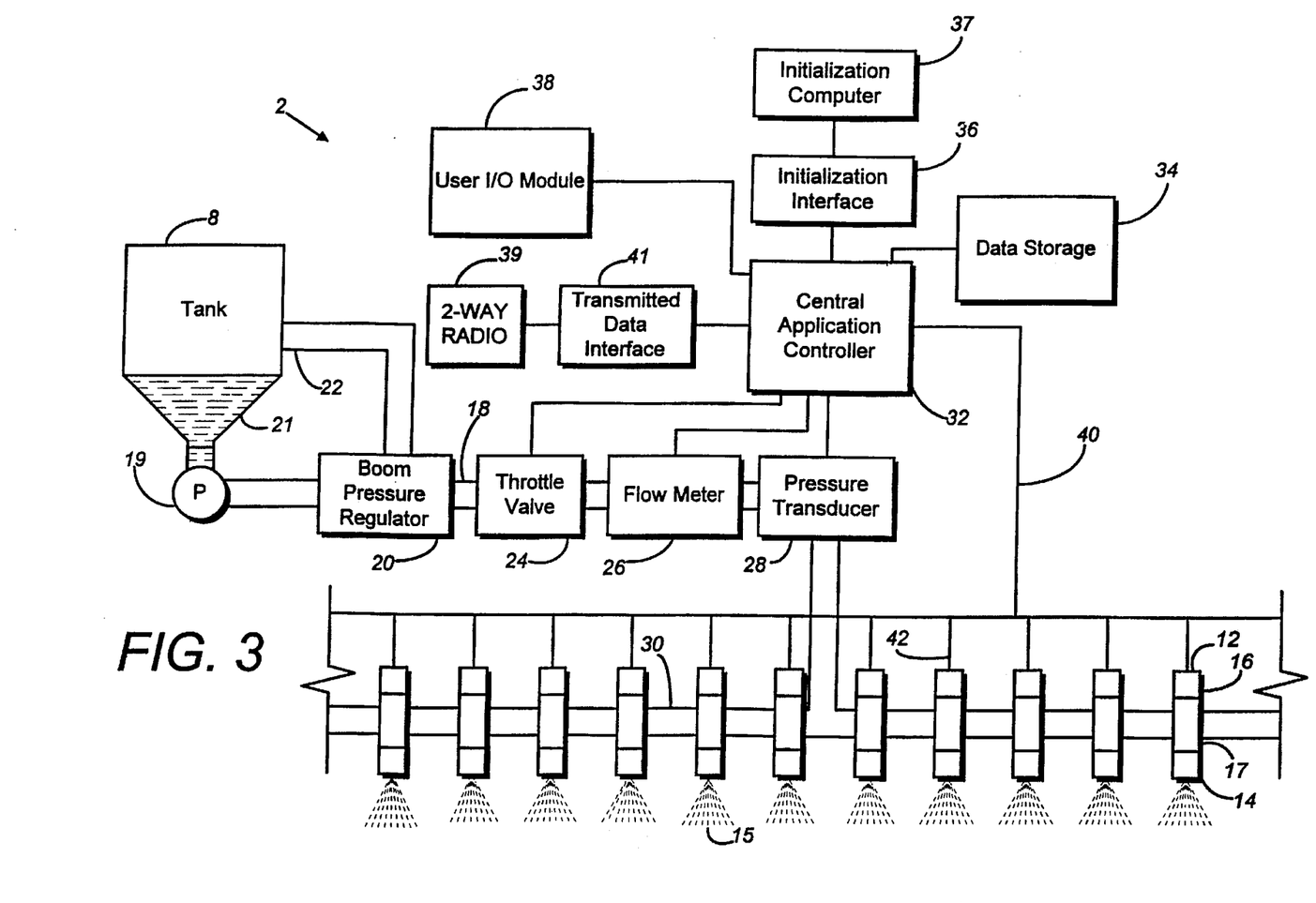
FIG. 3 is a schematic view of a spray system incorporating the flow rate and droplet size control system.

The agricultural sprayer 4 includes a pump 19 fluidically connected to the tank 8 and a fluid main 18. A pressure regulator 20 in the fluid main 18 can be preset to a predetermined maximum operating pressure whereby fluid 21 is returned to the tank 8 in the event of excessive pressure in the main 18 by means of a shunt or return line 22. The pump 19 can be variable speed or variable displacement for controlling the output from the tank 8 to the main 18.

A variable throttle valve 24 is provided for controlling pressure in the main 18. Fluid flow rates and pressures are monitored by a flow meter 26 and a pressure transducer 28 respectively. The main 18 communicates with a plurality of boom manifolds 30 each mounted on and extending along a respective boom 10. Each boom manifold 30 mounts a plurality of nozzle assemblies 12 at intervals along the booms 10. Various alternative mounting arrangements could be used for the nozzle assemblies 12, which could be connected to the manifolds 30 by branch lines of suitable lengths. The manifolds 30 selectively fluidically communicate with the nozzle tips 14 through the solenoid-actuated nozzle valves 17.

The nozzle assemblies 12 could be connected to multiple throttle valves 24 for selective, individual spray material pressure control whereby each nozzle assembly 12 could discharge spray 15 with a particular volume median droplet size spectrum. The spray system 3 can comprise one or more individual booms 10, each of which can be independently controlled. The agricultural sprayer 4 can comprise, for example, an "EAGLE" or "EAGLE II" sprayer available from RHS, Inc. of Hiawatha, Kans. Although a ground vehicle 6 is shown, a wide variety of other ground vehicles could be employed with the spray system 3. Moreover, the vehicle 6 could comprise an aircraft, particularly an aircraft designed and equipped for agricultural spraying operations. Both fixed wing aircraft and helicopters would be suitable for use with an adapted version of the spray system 3 and the independent flow rate and droplet size control system 2 therefor. The vehicle 6 could also comprise a combination of a trailer sprayer and a tow vehicle.

III. Flow Rate and Droplet Size Control System 2

The independent flow rate and droplet size control system 2 is generally shown in FIG. 3 and includes a central application controller 32 including a microprocessor chip (CPU) and necessary auxiliary components. The controller 32 is adapted to provide the normal functions associated with a microcomputer, including mathematical calculations, logic operations, data processing, read/write operations to an appropriate read/write data storage device or component 34 and to execute various program instructions.

An initialization interface 36 is provided for connecting the controller 32 to an initialization computer 37, which can comprise, for example, a portable computer used in the field for gathering data and the like. A user input/output module 38 is provided for receiving various inputs from a user on a variety of input devices, and for outputting data on a similarly wide range of output devices. A telecommunications device comprising a two-way radio 39 is shown in FIG. 3 and is adapted to transmit and receive radio frequency transmissions comprising operating information (e.g., ambient weather conditions, etc.) which are input to and output from the central application controller 32 through a transmitted data interface 41. The components described thus far are commonly available and would be found in many microcomputer systems.

The controller 32 communicates with the nozzle assembly solenoids 16 by means of a nozzle actuation bus 40 with a plurality of electrical wire nozzle leads 42 extending therefrom and electrically communicating with the respective solenoids 16. The nozzle assemblies 12 could also be interactive and networked for exchanging data amongst themselves and with the central application controller 32 by providing them with appropriate microprocessor components or chips. In addition to the components described above, the independent flow rate and droplet size control system 2 can include various other components as required for particular applications.

IV. Independent flow Rate Setpoint and Mean Droplet Size Setpoint Conversion Subroutine 66

Figure 4:
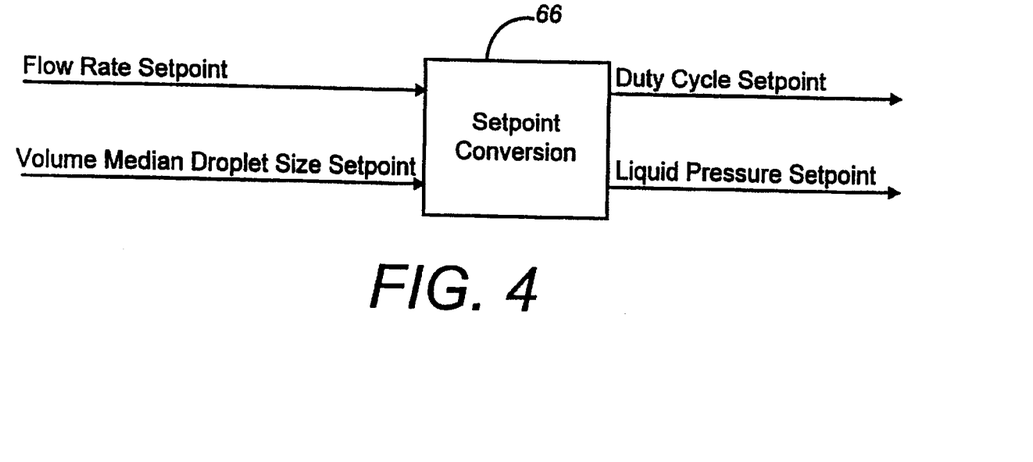
FIG. 4 is a schematic view of a subroutine for independently converting flow rate and droplet size setpoints to duty cycle and liquid pressure setpoints.

The flow rate and volume median droplet size operating parameters of the spray system 3 are determined by a flow rate and droplet size setpoint conversion subroutine 66 (FIG. 4), which enables independent flow rate and droplet size control with the spray control system 2. The flow rate is defined as the rate (e.g., gallons per minute, liters per minute, etc.) at which the liquid 21 flows through the spray system 3, as measured by the flow meter 26. As shown in FIG. 4, the flow rate and droplet size setpoints can be regarded as "inputs" to the setpoint conversion subroutine or procedure 66, with the duty cycle and operating pressure setpoints comprising the "outputs".

The droplet size spectrum of a flow nozzle tip 14 is generally a function of the liquid supply pressure, which is controlled by the throttle valve 24, and the characteristics of the nozzle tip 14. Such data is normally available from equipment manufacturers, spray chemical manufacturers and independent testing organizations. For example, FIG. 5 shows a performance curve relating the volume median droplet diameter in micrometers to a liquid supply pressure in kilopascals for a "TeeJet" Model XR8004 agricultural spray nozzle available from Spraying Systems, Inc. of Wheaton, Ill., as described in its Data Sheet No. 37043-5.

Figure 5:
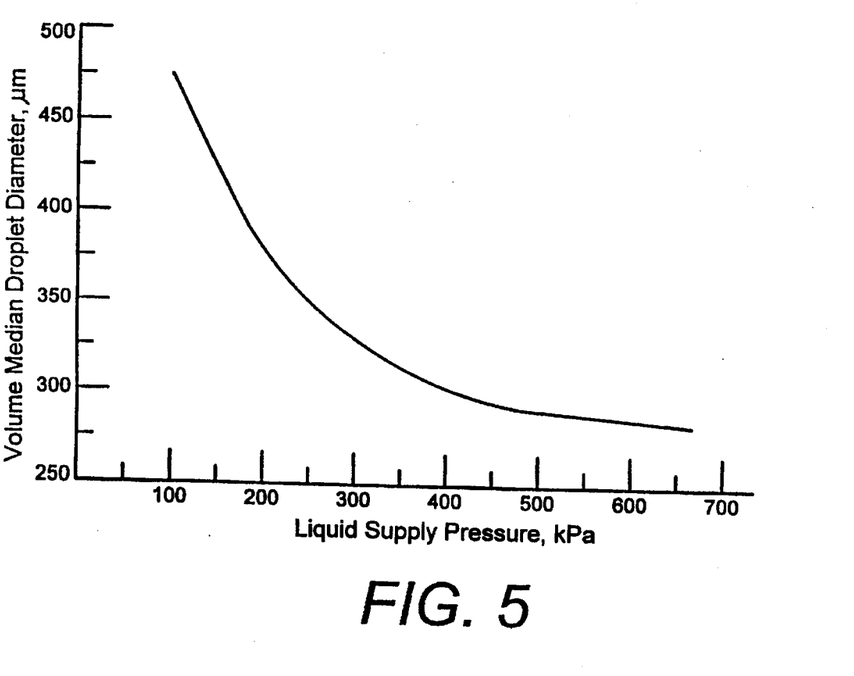
FIG. 5 is a graph which relates liquid supply pressure and volume median droplet diameter for a particular spray nozzle tip.

As can be observed in FIG. 5, volume median droplet diameter is nonlinearly related to pressure and decreases as pressure increases. Thus, relatively small pressure changes can increase the median spray droplet size in the ranges of relatively low pressure (i.e., to the left on the graph of FIG. 5).

Volume median droplet size is particularly significant in operation of the spray system 3 because it directly affects the drift characteristics of the spray 15, with larger droplets tending to fall more directly and thus be less susceptible to wind drift. The volume-weighted droplet size setpoint can comprise a cutoff value, such as 10% or some other fixed percentage, whereby a predetermined percentage of the spray volume emitted by the system 3 would equal or exceed a predetermined minimum volume droplet size.

The duty cycle can be expressed as a percentage of time when the nozzle valves 17 are open as compared to total time (i.e. time on+time off), which corresponds to a percentage of time that a solenoid 16 is energized. The duty cycle output of the setpoint conversion subroutine 66 (FIG. 4) can be convened to appropriate signals for the solenoids 16, for example, by a square wave generator as described in the aforementioned Giles et al. U.S. Pat. No. 5,134,961, and by alternative function generating circuits.

Figure 6:
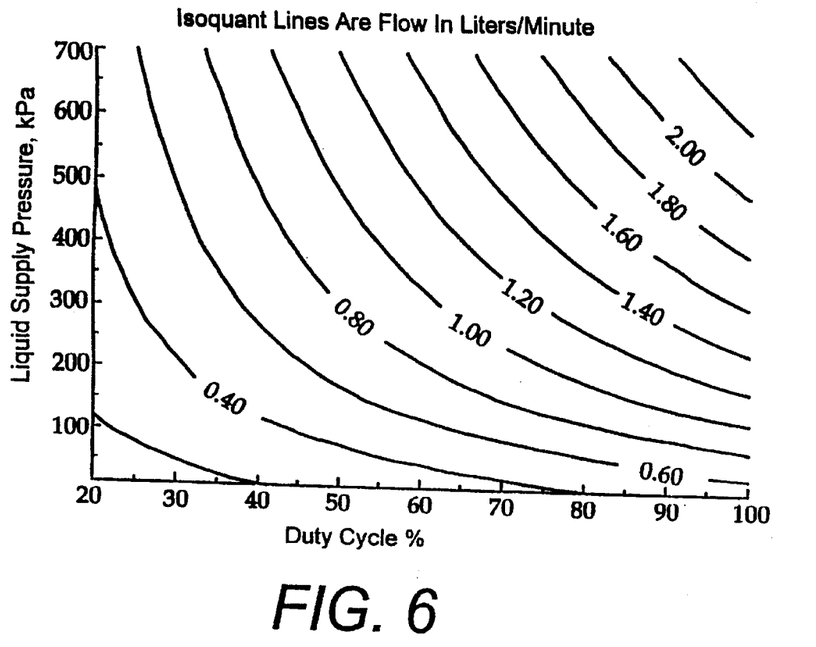
FIG. 6 is a graph which relates nozzle valve duty cycle percentage and liquid supply pressure for a particular spray nozzle tip at specific volumetric flow rates.

FIG. 6 relates the liquid supply pressure, the duty cycle and the flow rate setpoints, and shows the nonlinear relationship of the liquid supply pressure setpoints and the duty cycle setpoints at given, fixed flow rate setpoints for the exemplary model XR8004 nozzle. Thus, specific flow rates, such as those represented by the isoquant lines in FIG. 6, correspond to specific liquid supply pressure and duty cycle setpoints. In order to maintain a given flow rate, if one setpoint is changed, the other setpoint must also be changed.

The liquid flow rate is a function of both the operating pressure and the duty cycle, as shown in FIG. 6. Thus, a predefined volume median droplet size establishes a given liquid supply pressure, whereupon a flow rate is then achieved with the unique duty cycle setpoint that provides the desired flow rate. For a typical nozzle, the flow rate of liquid therethrough is nonlinearly proportional to the liquid pressure into the nozzle.

An important function of the setpoint conversion subroutine or procedure 66 (FIG. 4) is to provide for selective and independent control of the flow rate and droplet size setpoints, which comprise its inputs. Thus, both the flow rate and droplet size setpoints can be independently altered by initiating appropriate changes in the duty cycle and liquid pressure setpoints by means of the setpoint conversion subroutine 66. The setpoint conversion subroutine 66 methodology utilizes the performance data for the nozzle tips 14 and can be accomplished by referencing previously input look-up tables and the like, which can be stored in the data storage device 34.

It will be appreciated that the flow rate and median droplet size setpoints can themselves be automatically generated by a variety of data input sources, in addition to being manually input. Input can also be provided from sources such as soil sensors, cameras, etc. Thus, the initialization computer 37 can be programmed to establish such setpoints through an initialization interface 36 (FIG. 3) in response to various conditions in the field 5. Also as shown in FIG. 3, the central application controller 32 can receive input data through the two-way radio 39 by means of the transmitted data interface 41. Although a two-way radio is disclosed as an example of telecommunications means for receiving data for input to the central application controller 32 and for transmitting output data therefrom, other telecommunications devices could be also be employed for receiving and/or transmitting data, such as a wireless modem product produced by John Fluke, Incorporated. of Beaverton, Oreg. Thus, the agricultural sprayer 4 could receive current data broadcast from a remote location, whereby its operating parameters could be continuously updated to account for such changing conditions as temperature, windspeed, wind direction, etc.

Figure 7:
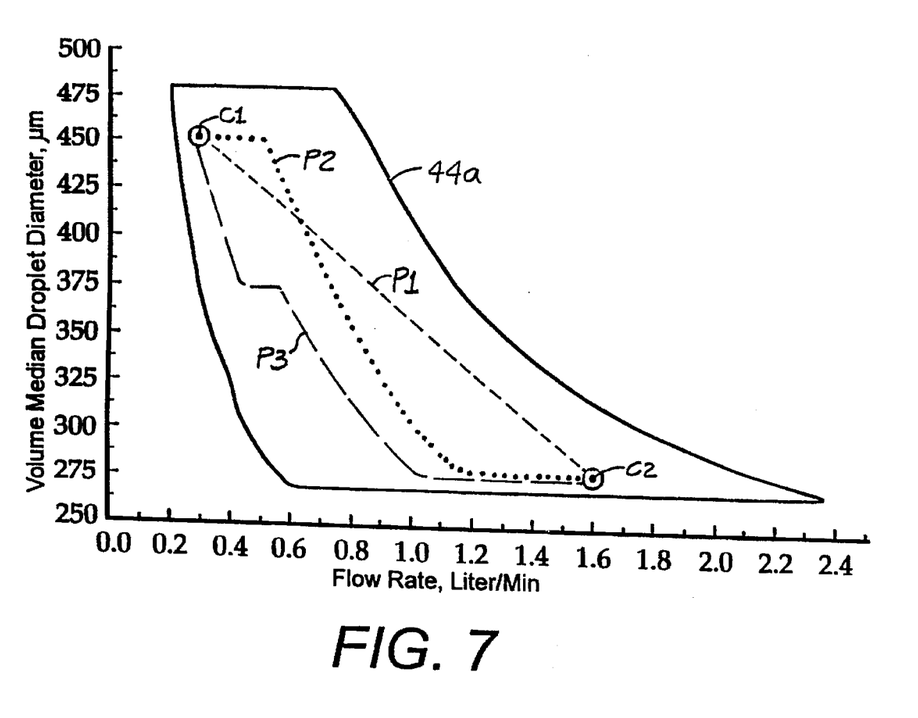
FIG. 7 is a graph which relates flow rate and volume median droplet diameter in a performance envelope for the spray system with a particular nozzle tip.

FIG. 7 shows a performance envelope 44a for the Spraying Systems "TeeJet" Model XR8004 fan nozzle within which parameters of volume median droplet diameter and flow rate can be achieved. Operating condition parameters within the envelope boundary 44a are achieved by varying the duty cycle and operating pressure setpoints, which comprise the outputs of the setpoint conversion routine 66.

As an example of the operation of the setpoint conversion procedure 66, a first operating condition C1 is shown in FIG. 7 and corresponds approximately to a median droplet diameter of 450 micrometers at a flow rate of approximately 0.3 liters per minute. FIG. 7 shows examples of procedures and setpoint alteration sequences for changing the operating parameters from those identified at C1 to a second condition identified by the point C2 whereat the median droplet diameter is 275 micrometers and the flow rate setpoint is 1.6 liters per minute. Such a transition can be achieved in various ways. For example, pathway P1 shows a direct pathway whereby both the duty cycle and the liquid pressure setpoints are simultaneously varied to achieve the conversion from condition C1 to condition C2.

Alternative pathway P2 shows first adjusting the flow rate by means of the duty cycle and thereafter adjusting the droplet size by varying the liquid pressure. The duty cycle is then adjusted to achieve the operating conditions (setpoints) associated with condition C2.

Yet another alternative C1-to-C2 pathway is identified as P3 and shows sequential adjustments to droplet median size alternating with adjustments to flow rate. Various other pathways could be utilized for adjusting the spray system 3 between conditions C1 and C2, and between various other condition points within the performance envelope 44a. Sequential adjustments in droplet size and flow rate setpoints may be preferable for system stability, and can be achieved with pathways similar to P2 and P3, but with smaller incremental changes.

Figure 8:
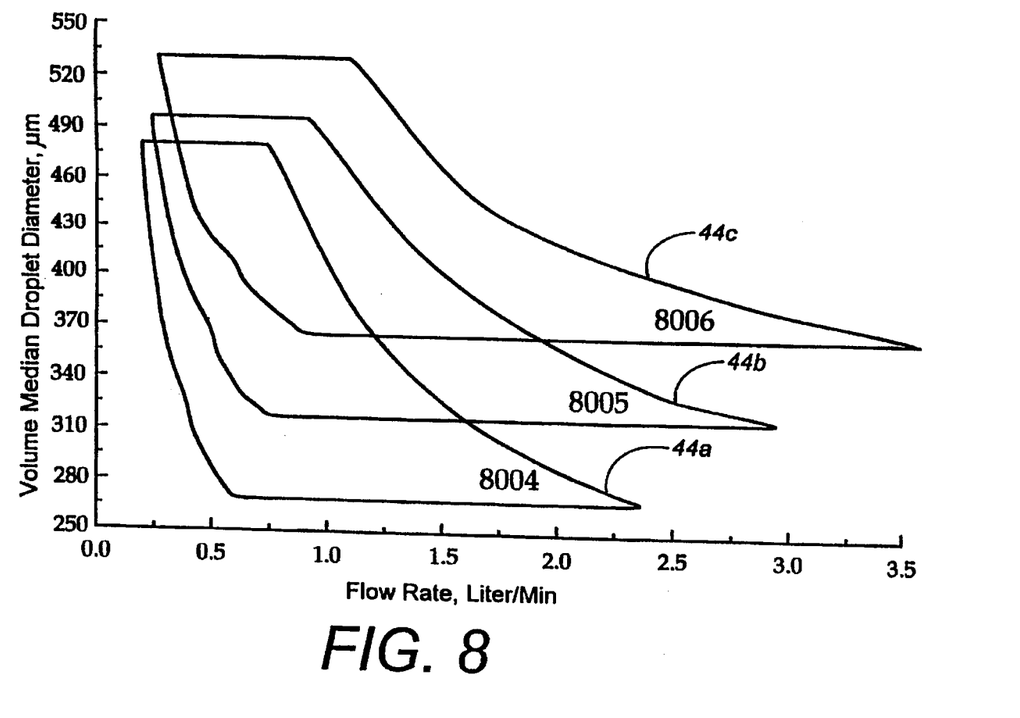
FIG. 8 is a graph which shows performance envelopes for other nozzle tips overlaid with the performance envelope shown in FIG. 7.

FIG. 8 shows nozzle operating condition envelopes 44b, 44c for Spraying Systems "TeeJet" Model XR8005 and Model XR8006 agricultural spray nozzles respectively, in addition to the previously-described operating condition envelope 44a for the Model XR8004 nozzle.

V. Application Control Process 60

Figure 9:
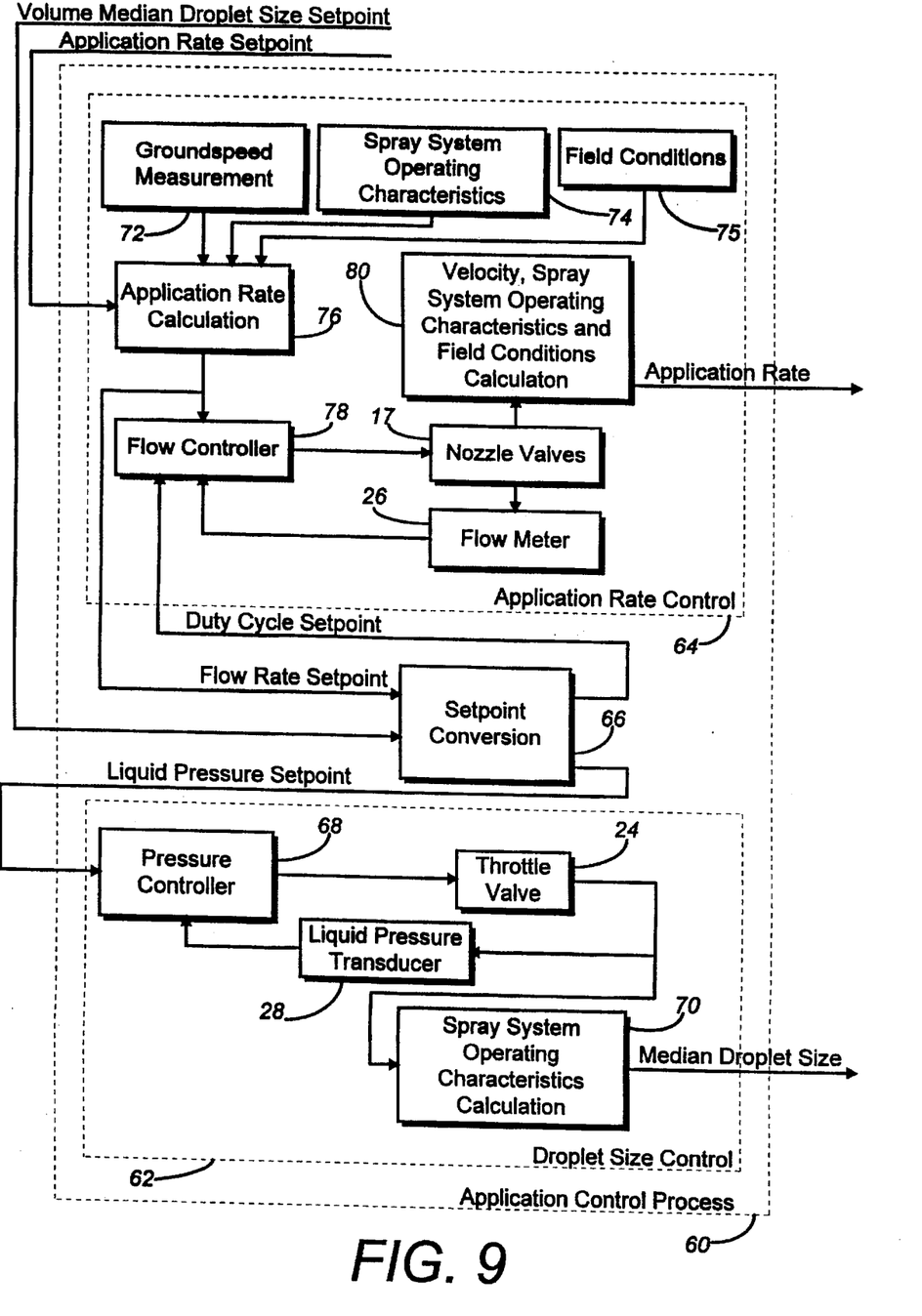
FIG. 9 is a schematic diagram of an application control process which utilizes independent flow rate and droplet size control.

FIG. 9 shows an exemplary application control process 60 utilizing the central controller 32 for attaining a desired application rate setpoint and a volume median droplet (VMD) size setpoint. The flow rate and droplet size setpoint conversion subroutine 66 described above comprises a procedure or subroutine within the control process 60 shown in FIG. 9 for independently controlling flow rate and droplet size.

The application control process 60 generally includes a droplet size control subsystem 62, an application rate control subsystem 64 and the setpoint conversion subroutine 66. The input data to the application control process 60 comprise the volume median droplet size setpoint and the application rate setpoint.

The droplet size control subsystem 62 receives a liquid pressure setpoint from the setpoint conversion subroutine 66 as described above, which is then input to a pressure controller 68. A throttle valve control signal is transmitted from the pressure controller 68 to the throttle valve 24, which opens or closes as necessary to a predetermined setting, which represents an approximation of the desired liquid pressure setpoint, as determined by the setpoint conversion subroutine 66. The droplet size control subsystem 62 is provided with a closed-loop correcting cycle which utilizes the liquid pressure transducer 28, the pressure controller 68 and the throttle valve 24 for making necessary corrections to achieve and maintain a desired liquid pressure.

The application control process 60 could receive a plurality of application rate setpoints and volume median droplet (VMD) size setpoints corresponding to a plurality of booms 10 or a plurality of nozzle assemblies 12. Such a control process system could be implemented by providing multiple droplet size control subsystems 62 and multiple application rate subsystems 64, each of which could be associated with a respective boom 10 or nozzle assembly 12. Other components, subsystems and subroutines of the spray system 3 and the control system 2 therefor could be provided in appropriate multiples to implement independent and selective control of application rate setpoints and volume median droplet (VMD) size setpoints of corresponding pluralities of booms 10 or nozzles 12.

As shown in FIG. 9, the volume median droplet size is a function of the liquid pressure and the system characteristics, which are factored in at 70 and can include such factors as the nozzle tip 14 characteristics, properties of the liquid 21 and various other factors such as characteristics of the agricultural sprayer 4 and ambient conditions. Data for calculating the effects of the spray system characteristics 70 on the droplet size can be stored in the flow rate and droplet size control system 2, for example, in the read/write data storage device 34 thereof and can be input with the user input/output module 38.

The application rate setpoint is input to an application rate calculation 76, which also receives input data comprising a groundspeed measurement 72 of the spray vehicle 6, for example, from a groundspeed measuring device on the vehicle 6 or from a GPS source (as described later), and spray system operating characteristics 74 such as number, spacing and configuration of nozzle tips 14, width and height of boom 10, and other conditions. The spray system operating characteristics 74 are particularly significant when the vehicle 6 comprises an aircraft, which can be located at different altitudes above the field 5. Such spray system characteristics 74 can be derived from the read/write data storage device 34, or provided in any other suitable manner. Field conditions 75 are also input to the application rate calculation 76.

The application rate calculation 76 transmits a signal to the flow controller 78, and a flow rate setpoint to the setpoint conversion subroutine 66 as described above. The flow controller 78 can include a function generator and amplifier system such as that described in the Giles U.S. Pat. No. 5,134,961, or any other suitable function generator. The signals output by the flow controller 78 are distributed to the nozzle solenoids 16 by the individual nozzle leads 42, which collectively form a nozzle bus 40.

The application rate control subsystem 64 includes a closed-loop flow rate correcting system including the flow controller 78, the nozzle solenoids 16 and the flow meter 26 whereby the flow controller 78 receives an initial or anticipated approximate duty cycle setpoint from the setpoint conversion subroutine 66. Continuous corrections are made to the flow rate by altering the duty cycle signals output to the valve solenoids 16. It will be appreciated that the duty cycle signals transmitted by the flow controller 78 can range from a relatively low or zero percentage of "open nozzle" time to a relatively high percentage, or even a continuously open condition of the nozzle valves 17.

The effects of additional factors on the application rate, such as groundspeed of the spray vehicle 6, characteristics of the nozzles 14 and booms 10, field conditions 75 and ambient conditions are taken into account in calculating the application rate at 80.

As noted above, the application rate and the droplet size setpoints can be adjusted selectively and independently of each other, with the central application controller 32, and more specifically its setpoint conversion subroutine 66, providing the necessary adjustments to the pressure and duty cycle setpoints by means of the throttle valve 24 and the flow controller 78 respectively. It will be appreciated that the application control process 60 can be implemented with the control system 2 including the controller 32, or with any other suitable control system, such as another type of programmable controller.

IV. First Alternative Embodiment Position-Responsive Sprayer Control System 202

Figure 10:
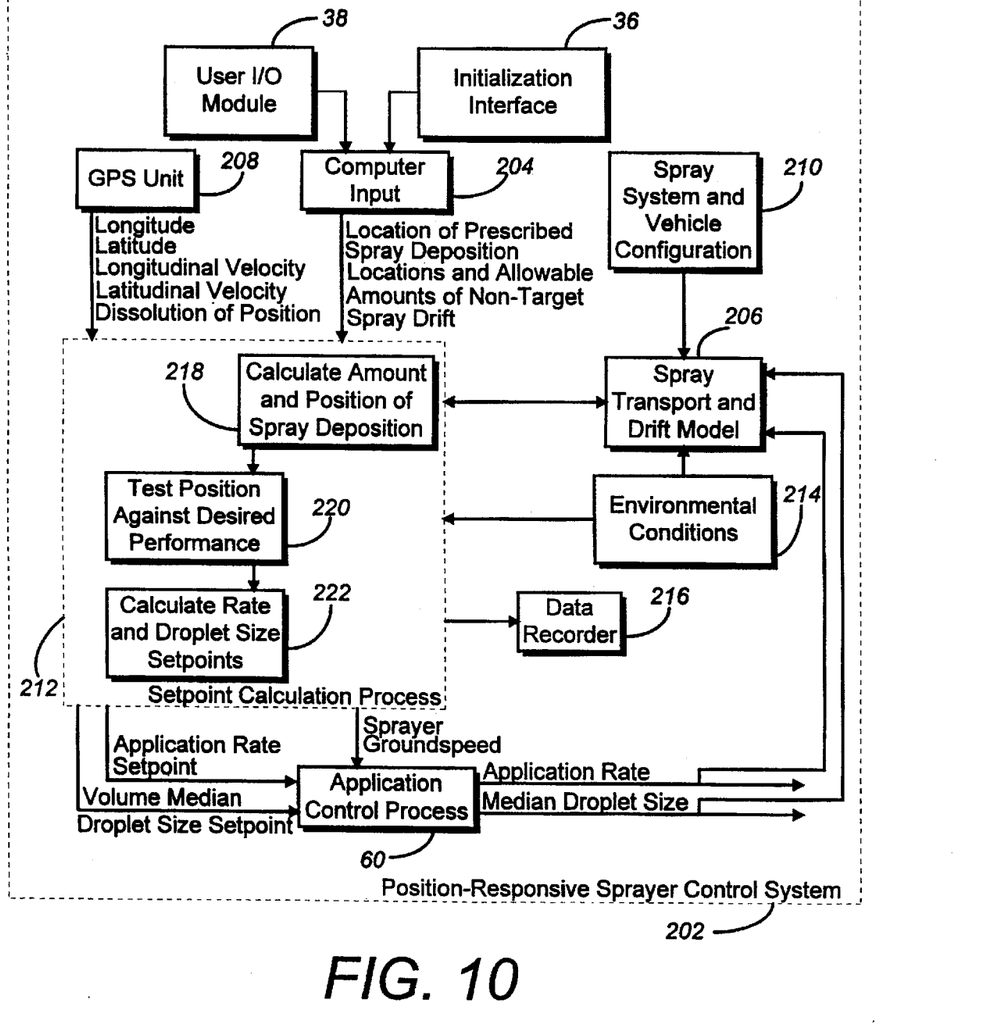
FIG. 10 is a schematic diagram showing a position-responsive sprayer control system comprising a first modified or alternative embodiment of the present invention.

A position-responsive sprayer control system comprising a first modified or alternative embodiment of the present invention is shown in FIG. 10 and is generally designated by the reference numeral 202. As with the previously described flow rate and droplet size control system 2, the position-responsive sprayer control system 202 includes the exemplary application control process 60 which receives application rate and droplet size setpoints as inputs and provides the necessary control signals for independently controlling flow rates and droplet sizes. Also as shown in FIG. 10, the sprayer 4 groundspeed is yet another factor taken into account in the application control process in determining the application rate setpoint.

The droplet size setpoint and the application rate setpoint can be automatically determined from user-defined characteristics of a prescribed amount and location of spray deposition on a particular field. Such user-defined characteristics can include the no-spray zone 5a, which is located outside of a first boundary 7a, and the first spray zone 5b wherein a predetermined application rate and droplet size spectrum are required. The field 5 can also include a second spray zone 5c, wherein a reduced spray application rate is required. The number of zones of the field 5 which are to receive varying amounts of spray material per unit area and different droplet sizes is practically unlimited, and can accommodate a wide variety of different field conditions.

Each spray zone can correspond to predefined operating conditions stored in the control system 202. For example, conditions C1 and C2 (FIG. 7) can correspond to spray zones 5b, 5c, with the control system 202 automatically initiating a condition change when the vehicle leaves one of the spray zones and enters another. The control system 202 can individually control the nozzle assemblies 12. For example, if the vehicle 6 were straddling a spray zone boundary with part of the spray swath in one spray zone and part in another, multiple operating conditions could be simultaneously implemented by the control system 202. As a further example, a relatively low percentage droplet size cutoff (e.g., 10%) may be required adjacent to the no-spray zone 5a to minimize problems associated with potential spray drift.

The control system 202 includes a computer input 204 which receives input from the user input/output module 38 and the initialization interface 36. For example, such input can comprise the application flow rate for a given zone of the field 5, the spray material droplet size spectrum and the locations of the spray zone boundaries 7a, 7b. The sprayer 4 position can be identified using latitude and longitude or any other suitable means for identifying geographic locations.

A typical, desirable sprayer control result to be simultaneously achieved with the system 202 could comprise:

(1) The application of a predetermined amount of spray material in a given geographic area, i.e., at approximately the application rate setpoint for the different field zones 5b, 5c;

(2) A gradient of reduced-amount spray deposition and a larger, less drift-prone droplet size spectrum in peripheral regions of the field, such as adjacent to the boundary 7a of the no-spray zone 5a; and (3) Little or no deposition of spray material in no-spray zones such as 5a beyond the boundary 7a.

A spray transport and drift mathematical model 206 is utilized and receives as an input spray system and vehicle configuration data 210, which can comprise the airflow characteristics of the spray vehicle 6, the direction and travel speed of the spray vehicle 6 and the weight and vibration of the spray vehicle 6. Environmental conditions 214 can include wind speed, turbulence, wind direction, relative humidity, etc and are input to the spray transport and drift model 206. Moreover, the orientation, height and spacing of spray discharge 15 from the nozzle tips 14, field conditions such as topography and vegetation in the spray target zones and surrounding areas and the liquid properties of the spray mix can effect the transport and deposition of the spray 15. The control system 202 can utilize some or all of these factors for independently controlling the application flow rate and droplet size setpoints. The spray transport and drift model 206 can comprise the FSCBG (Forest Service Cramer-Barry-Graham) model developed by the U.S. Forest Service.

A setpoint calculation process 212 is provided for generating the application rate and droplet size setpoints for the application control process 60 by calculating the amount and position of spray deposition, as at 218. A test is conducted against a desired performance at 220 and appropriate adjustment made to the setpoints. The application rate and droplet size setpoints are thereafter calculated at 222.

A global positioning system (GPS) unit 208 is provided for determining position, groundspeed and trajectory of the vehicle 6 and transmits data to the setpoint calculation process 212. As the spray vehicle 6 moves, the current spray material application rate and the droplet size spectrum are used by the spray transport model 206, along with the previously described model inputs to predict the position, amount and distribution of the deposition of currently emitted spray. Such predictions are transferred to the rate and droplet size setpoint calculation process 212 which compares the actual performance to the desired performance and adjusts the application rate setpoints and the droplet size setpoints as necessary.

A data recorder 216 is provided for monitoring, logging and recording vehicle conditions, vehicle position, vehicle groundspeed or velocity, spray material application rate, droplet size spectrum, boom pressure, boom flow rate and other pertinent operational data.

In operation, especially with rapid vehicle movement, the time required for spray transport from the nozzles to the spray zones 5b, 5c, together with time delays in actuation of the nozzle valves 17 and the throttle valves 24, will often require the setpoint calculation process 212 to generate predicted future setpoints. The control system 202 can thus anticipate and adapt in advance to different conditions, as opposed to merely reacting thereto. The control system 202 automatically uses information such as the velocity of the spray vehicle 6 for determining future trajectory of the vehicle 6 while the transport model 206 is used to determine future application rate setpoints and future droplet size setpoints.

It is to be understood that while certain forms of the present invention have been illustrated and described herein, it is not to be limited to the specific forms or arrangement of parts described and shown.

What is claimed and desired to be secured by Letters Patent is as follows:

1. A flow rate and droplet size control system for a spray system including a spray liquid source, discharge pressure means associated with said spray liquid source and a nozzle assembly connected to said spray liquid source and having a nozzle tip and a nozzle valve movable between open and closed positions, which comprises:
(a) variable duty cycle setpoint control means for opening and closing said nozzle valve and for varying the timing of the opening and closing duty cycles thereof;
(b) variable discharge pressure setpoint control means for varying the discharge pressure of said spray liquid; and
(c) an application controller including:
    (1) means for receiving a flow rate setpoint;
    (2) means for receiving a volume median droplet size setpoint; and
    (3) a setpoint conversion subroutine for receiving said flow rate and volume median droplet size setpoints as inputs and independently controlling said variable duty cycle setpoint control means and said variable discharge pressure setpoint control means for providing independent flow rate and droplet size control.

2. The control system according to claim 1, which includes:
(a) a pressure controller receiving said spray liquid pressure setpoint and operably connected to said pressure setpoint control means.

3. The control system according to claim 2, which includes:
(a) a spray liquid pressure transducer providing a signal corresponding to a pressure of said spray liquid; and
(b) said spray liquid pressure transducer being connected to said pressure controller in a closed-loop feedback subroutine with said pressure controller and said spray liquid pressure setpoint control means for controlling a discharge pressure setpoint of said spray liquid.

4. The control system according to claim 2, which includes means for inputting nozzle characteristics to said application controller.

5. The control system according to claim 1, which includes:
(a) said application controller having application rate calculation means for receiving an application rate setpoint and for providing an input to said setpoint conversion subroutine for determining a flow rate setpoint.

6. The control system according to claim 5, which includes:
(a) a flow controller connected to said application rate calculation means and to said setpoint conversion subroutine for providing a duty cycle signal to said nozzle valve responsive to inputs from said application rate calculation and said setpoint conversion subroutine.

7. The control system according to claim 6, which includes:
(a) a flow meter connected to said spray liquid source and providing a signal to said flow controller; and
(b) a closed-loop feedback subroutine connected to said flow meter for maintaining a relatively constant flow rate of spray liquid through said nozzle.

8. The control system according to claim 5, which includes:
(a) means for inputting spray system operating characteristics to said application rate calculation means.

9. The control system according to claim 1, which includes:
(a) said nozzle assembly having a performance envelope defined by volume median droplet size and flow rate operating parameters.

10. The control system according to claim 9, which includes:
(a) said application controller including means for altering a first operating condition of said spray system to a second operating condition within said nozzle assembly performance envelope.

11. The control system according to claim 10 wherein:
(a) said application controller includes means for simultaneously adjusting the median droplet size diameter and the flow rate as said controller alters said spray system operating conditions from said first condition to said second condition.

12. The control system according to claim 9, which includes:
(a) said application controller including data storage means for storing performance envelopes for a plurality of spray nozzles.

13. The control system according to claim 12, which includes:
(a) said application control system including a plurality of predefined pathways for changing said operating conditions, each said pathway being associated with predefined changes in said median spray droplet size and flow rate setpoints.

14. The control system according to claim 1, which includes:
(a) means for storing a predetermined spray deposition location.

15. The control system according to claim 14, which includes:
(a) means for controlling said application controller in response to a position of said spray system with respect to said spray deposition location.

16. The control system according to claim 14, which includes:
(a) said spray deposition location comprising a first location;
(b) a second spray deposition location;
(c) a first operating condition corresponding to a first predetermined median spray droplet size setpoint and a first predetermined flow rate setpoint;
(d) a second operating condition corresponding to a second predetermined median spray droplet size setpoint and a second predetermined flow rate setpoint; and
(e) said application controller including a setpoint conversion subroutine for changing from said first operating condition to said second operating condition in response to said spray system moving from one of said spray deposition locations to the other of said spray deposition locations.

17. The control system according to claim 14 wherein:
(a) said application controller includes means for determining a position of said spray system.

18. The control system according to claim 17 wherein:
(a) said application controller includes means for comparing a position of said spray system to a predetermined spray deposition location.

19. The control system according to claim 17 wherein:
(a) said means for determining a position of said spray system includes means responsive to a global positioning system (GPS).

20. The control system according to claim 14, which includes:
(a) a spray transport and drift model; and
(b) means for transferring data from said spray transport and drift model to said application controller.

21. The control system according to claim 14, which includes:
(a) a data recorder recording data corresponding to operating conditions and spray system locations.

22. The control system according to claim 1 wherein said variable discharge pressure setpoint control means comprises liquid pressure control means associated with said discharge pressure means and said nozzle assembly.

23. The control system according to claim 1 wherein said spray system is mounted on a vehicle comprising a ground vehicle.

24. The control system according to claim 1 wherein said spray system is mounted on a vehicle comprising an aircraft.

25. The control system according to claim 1, which includes two-way telecommunications means for inputting data to and outputting data from said control system.

26. The control system according to claim 1, which includes:
(a) a plurality of said nozzle assemblies; and means for selectively and independently controlling said nozzle assemblies.

27. The control system according to claim 26, which includes:
(a) a plurality of networked microprocessors each associated with a respective nozzle assembly before controlling same.

28. A flow rate and droplet size control system for a spray system including a spray liquid tank, a pump fluidically connected to the tank, a spray liquid line fluidically connected to the pump and a plurality of nozzle assemblies fluidically connected to the spray liquid line and each having a nozzle valve movable between open and closed positions and a nozzle tip, which independent flow rate and droplet size control system comprises:
(a) a setpoint conversion subroutine receiving as inputs a flow rate setpoint and a volume median droplet size setpoint and providing as outputs a duty cycle setpoint and a liquid pressure setpoint, said setpoint conversion subroutine including means for independently controlling the flow rate and droplet size;
(b) an application rate control subsystem receiving said duty cycle setpoint from said setpoint conversion subroutine and including a flow controller with function generation means for generating control signals for said nozzle valves corresponding to duty cycles thereof and a flow meter fluidically connected to said spray liquid line;
(c) said flow controller, nozzle valves and flow meter forming a closed-loop feedback subsystem for maintaining a relatively constant flow rate;
(d) a droplet size control subsystem receiving said liquid pressure setpoint from said setpoint conversion subroutine and including a pressure controller, pressure control means in said spray liquid line for controlling pressure therein and receiving a pressure control signal from said pressure controller and a liquid pressure transducer in said spray liquid line providing a signal corresponding to a liquid pressure therein to said pressure controller; and
(e) said pressure controller, said pressure control means and said liquid pressure transducer forming a closed-loop feedback subsystem for maintaining a relatively constant liquid pressure in said spray liquid line.

29. A flow rate and droplet size control method for a spray system including a spray liquid source, variable discharge pressure control means associated with said spray liquid source and a nozzle assembly with a nozzle tip for discharging said spray liquid and a nozzle valve movable between open and closed positions, which comprises the steps of:
(a) inputting flow rate and volume median droplet size setpoints;
(b) outputting a liquid pressure setpoint;
(c) adjusting said pressure control means in response to said liquid pressure setpoint;
(d) outputting a duty cycle setpoint for said nozzle valve;
(e) adjusting the duty cycle of said nozzle valve assembly corresponding to the timing of cycles thereof between open and closed positions in response to said flow rate setpoint;
(f) providing a setpoint conversion subroutine for receiving said flow rate and volume median droplet size setpoints as inputs; and
(g) independently controlling said duty cycle setpoint and said liquid pressure setpoint for providing independent flow rate and droplet size control.

30. The method according to claim 29, which includes the additional steps of:
(a) receiving a volume median droplet size setpoint; and
(b) correlating said spray liquid volume pressure setpoint to said median droplet size setpoint.

31. The method according to claim 29, which includes the additional step of:
(a) altering said flow rate setpoint while maintaining said volume median droplet size setpoint.

32. The method according to claim 29, which includes the additional step of:
(a) altering said volume median droplet size setpoint while maintaining said flow rate setpoint.

33. The method according to claim 29, which includes the additional step of:
(a) simultaneously altering said flow rate setpoint and said volume median droplet size setpoint from a first operating condition having first predefined flow rate and droplet size setpoints to a second operating condition having second predefined flow rate and droplet size setpoints.

34. The method according to claim 29, which includes the additional steps of:

(a) setting said spray system at a first predetermined operating condition corresponding to a first predetermined droplet size setpoint and a first predetermined flow rate setpoint; and (b) adjusting said spray system to a second predetermined operating condition corresponding to a second predetermined droplet size setpoint and a second predetermined flow rate setpoint by sequentially altering said droplet size and said flow rate setpoints.

35. The method according to claim 29, which includes the additional steps of:

(a) providing a spray liquid pressure transducer;

(b) providing a signal from said spray liquid pressure transducer corresponding to a pressure of said spray liquid; and (c) providing a pressure controller in a feedback loop with said spray liquid pressure transducer and said pressure control means for controlling a pressure of said spray liquid.

36. The method according to claim 29, which includes the additional steps of:

(a) providing two-way telecommunications means; and (b) communicating with said control system by means of said two-way telecommunications means.

37. The method according to claim 29, which includes the additional steps of:

(a) providing a flow controller;

(b) generating a variable duty cycle signal with said flow controller; and (c) sequentially opening and closing said nozzle valve with said duty cycle signal.

38. The method according to claim 37, which includes the additional steps of:

(a) providing a flow meter associated with said spray liquid source;

(b) generating a signal from said flow meter; and (c) providing a closed-loop feedback subroutine with said flow meter and said flow controller and substantially maintaining a flow rate setpoint therewith.

39. The method according to claim 29, which includes the additional steps of:

(a) calculating an application rate setpoint of said spray liquid; and (b) inputting spray system operating characteristics and a flow rate setpoint in calculating said application rate setpoint.

40. The method according to claim 29, which includes the additional step of:

(a) providing a performance envelope associated with said nozzle tip and defined volume by median droplet size and flow rate operating parameters.

41. The method according to claim 40, which includes the additional steps of:

(a) inputting an additional performance envelope for a different nozzle tip; and (b) providing for operation with either of said nozzle tips by referencing a respective performance envelope.

42. The method according to claim 40, which includes the additional steps of:

(a) providing first and second operating conditions within said performance envelope; and (b) adjusting said duty cycle and said liquid pressure setpoints from said first operating condition within said performance envelope to said second operating condition within said performance envelope.

43. The method according to claim 29, which includes the additional steps of:

(a) providing soil sensors in a spray zone; and (b) inputting data from said soil sensors to said control system.

44. The method according to claim 29, which includes the additional steps of:

(a) defining a spray zone;

(b) associating an application rate with said spray zone;

(c) mounting said spray system on a vehicle;

(d) traversing said spray zone with said vehicle; and (e) controlling said spray application rate within said spray zone.

45. The method according to claim 44, which includes the additional steps of:

(a) defining said spray zone as a first spray zone;

(b) defining a second spray zone;

(c) defining a first spray condition corresponding to a first flow rate setpoint and a first volume median droplet size setpoint associated with said first spray zone;

(d) defining a second spray condition corresponding to a second flow rate setpoint and a second volume median droplet size setpoint;

(e) operating said spray system at approximately said first condition within said first spray zone; and (f) operating said spray system at approximately said second condition within said second spray zone.

46. The method according to claim 29, which includes the additional steps of:

(a) providing a camera and inputting data to said control system from said camera.

47. The method according to claim 44, which includes the additional steps of:

(a) monitoring a position of said spray vehicle; and (b) controlling said spray system in response to said spray vehicle position.

48. The method according to claim 47, which includes the additional steps of:

(a) determining a latitudinal and longitudinal position of said spray vehicle with a global positioning system; and (b) determining a direction-of-travel and a groundspeed of said spray vehicle and inputting same to said control system.

49. The method according to claim 45, which includes the additional steps of:

(a) providing a setpoint calculation process for calculating an application rate setpoint and a volume median droplet size setpoint and outputting same to an application control process;

(b) providing inputs to the setpoint calculation process consisting of the spray system position, groundspeed and direction of travel; and (c) providing setpoint calculation process input information consisting of the location of field zones and the application rates associated with each.

50. The method according to claim 49, which includes the additional step of:

(a) initializing a computer input of said setpoint calculation process with operating parameters for said spray system.

51. The method according to claim 49, which includes the additional step of:

(a) providing a spray transport and drift model to said setpoint calculation process.

52. The method according to claim 51, which includes the additional step of:

(a) imputting environmental condition process and to said setpoint calculation process and to said spray transport and drift model.

53. The method according to claim 51, which includes the additional step of:

(a) providing spray system and vehicle configuration information as inputs to said spray transport and drift model.

54. The method according to claim 51, which includes the additional steps of:

(a) providing a data recorder; and (b) outputing information pertaining to the operation of said spray system from said setpoint calculation process to said data recorder.

55. The method according to claim 44, wherein said vehicle comprises a ground vehicle.

56. The method according to claim 44 wherein said vehicle comprises an aircraft.

* * * * *